United States Patent

[11] 3,621,053

| [72] | Inventors | Tatsuyoshi Kobayashi<br>RA 24,537 Ikejiri-cho Setagaya-ku;<br>Isei Nakamura, 14-9, 2-chome, Arai, both<br>of Tokyo, Japan |
|---|---|---|
| [21] | Appl. No. | 693,706 |
| [22] | Filed | Dec. 27, 1967 |
| [45] | Patented | Nov. 16, 1971 |

[54] PROCESS FOR RECOVERING ITACONIC ACID AND SALTS THEREOF FROM FERMENTED BROTH
4 Claims, No Drawings

| [52] | U.S. Cl. | 260/527 R, |
| | | 260/435 R |
| [51] | Int. Cl. | C07c 51/42, |
| | | C07c 51/52 |
| [50] | Field of Search | 260/527 N |

[56] References Cited
UNITED STATES PATENTS

| 2,789,135 | 4/1957 | Hoglan et al. | 260/527 |
| 3,330,862 | 7/1967 | Barkowski et al. | 260/515 |

*Primary Examiner*—James A. Patten
*Assistant Examiner*—Vivian Garner
*Attorney*—McGlew and Toren

ABSTRACT: By adding a suitable amount of basic lead carbonate to the filtrate of itaconic acid fermentation broth, the lead salt of the itaconic acid is precipitated and then separated from the solution. This lead salt of the acid is double decomposed by adding a solution of carbonate or bicarbonate of alkali or ammonium. The precipitate of basic lead carbonate formed in the solution can be separated and recycled to the first step of the process. The alkali or ammonium salt of the itaconic acid in solution can then be crystallized by concentration to obtain said acid salt or contacted with a cation-exchanger to form the free acid which can be crystallized from the solution.

PROCESS FOR RECOVERING ITACONIC ACID AND SALTS THEREOF FROM FERMENTED BROTH

The present invention relates to a process for separating organic acid from the fermented broth of the itaconic acid fermentation using raw materials such as blackstrap molasses, in which substantial impurities are contained.

The object of the invention is to separate the itaconica acid at high yield from the broth of the itaconic acid fermentation using molasses, and the like.

Separating the itaconic acid from the broth of the itaconic acid fermentation using molasses, and the like, have hitherto been carried out exclusively by means of evaporation-crystallization process or calcium-salt-precipitation process, and the like. Applicants have not seen any other process described in the literature apart from the above.

Beside sugar components, the crude sugar source for fermentation such as molasses contains large quantities of nonsugar carbon-compounds and ashes in soluble state and the greater part of these impurities is not utilized by the micro-organisms and remains in the broth after the fermentation.

Accordingly, when such fermented broth is concentrated, the viscosity of the liquid increases remarkably, so crystallization of the desired organic acid becomes slow and the separation of the crystals from the mother liquor becomes very difficult.

We have studied means for separating the itaconic acid from the broth of the itaconic acid fermentation using sugar sources in which substantial quantities of impurities are contained, as described above, and have found that the desired organic acid can easily be separated at high yield without concentrating the fermented broth by means of adding basic lead carbonate to the said fermented broth. That is, when a suitable amount of basic lead carbonate is added to the filtrate of the fermented broth, the acid radical of the itaconic acid is substituted by the carbonate radical of the basic lead carbonate and the formed lead salt of the acid precipitates. When the filtrate of the broth is heated to about 100° C. the reaction is completed within a short time. The solubility of the lead salt of itaconic acid is very slight, i.e., that of itaconate is 0.007 percent far lower than that of the corresponding calcium salt. Therefore, the desired acid can be separated efficiently by the process of the present invention even when the concentration of the itaconic acid in the fermented broth is very dilute.

The lead salt of the itaconic acid which is separated from the mother liquor in this process is transformed to the alkali or ammonium salt of the itaconic acid by adding a solution of carbonates or bicarbonates of alkali metal or ammonium. The alkali or ammonium salt of the itaconic acid is soluble in the solution. The lead in the above solution precipitates as basic lead carbonate which can be recycled again to the first step of this process.

By concentrating the solution of alkali or ammonium salt of the itaconic acid, the alkali of ammonium salt will be crystallized. On the other hand, the above solutions can be transformed to free acid solutions by using a cation-exchanger and the desired, organic acid is crystallized as big crystal by concentrating the solution.

According to the process of the invention, the itaconic acid formed in the fermentation broth can be easily separated without using ordinary concentration-crystallization process, and the separation yield of the itaconic acid by this process is very high even in case of using fermentation broth having lower concentration of the acid, due to less solubility of lead salt of the itaconic acid. The present process has also an excellent advantage in that the basic lead carbonate can be recycled to the first step of this process, when the above lead salt of the acid is decomposed by carbonate or bicarbonate of alkali metal or ammonium.

The invention will be described more particularly in the following examples.

EXAMPLE 1

Blackstrap molasses (150g.) produced in Thailand, was diluted with 1,050 ml. of tap water, and 0.15 percent of ammonium sulfate and 0.1 percent of monopotassium phosphate were added to this solution. This medium solution was dispensed 100 ml. by 100 ml. into nine Sakaguchi's flasks having a capacity of 500 ml. and sterilized at 100° C. for 30 minutes with steam. After cooling, the medium in each flask was inoculated with 2–3 platinum loopfuls of spores of *Aspergillus terreus* K26, the inoculated medium was cultured at 36° C. on the reciprocating shaker. After 48 hours copper sulfate and zinc sulfate were added to the culture medium so as to incorporate 50 p.p.m. of $Cu^{++}$ and 40 p.p.m. of $Zn^{++}$ respectively into the solution, and the cultivation was further carried out for 138 hours.

The fermented broth was centrifuged and 797 ml. of cleared filtrate having a density of 1.0289 were obtained. The concentration of itaconic acid in the filtrate was 3.23 g./100 ml., that a remaining total sugar was 1.58 g./100 ml. and the yield of itaconic acid from the consumed sugar was 50 percent.

Basic lead carbonate (37.1 g.) was added to 250 ml. of the above filtrate, the solution was agitated sufficiently at room temperature and heated at 100° C. for 10 minutes. The solution was centrifuged and 67.7 g. of wet crystals of lead itaconate and 221.2 ml. of the mother liquor in which 0.1 g. of itaconic acid is present, were obtained. The wet crystals of lead itaconate were washed with 440.7 g. of water, centrifuged and 65.5 g. of wet crystals and 442.8 ml. of washing water containing 0.02 g. of itaconic acid were obtained. The wet crystals were dried at 105° C. overnight and 45.5 g. of crude lead itaconate was obtained.

Soduim bicarbonate (3.43 9.) and 19.6 g. of water were added to 10.0 g. of the above crude lead itaconate, the mixture was agitated sufficiently at room temperature and further heated at 100° C. for 10 minutes. The mixture was centrifuged and 12.5 g. of wet crystals of basic lead carbonate, 17.6 ml. of mother liquor containing 2.0 g. of sodium itaconate (corresponding to 1.5 g. of free itaconic acid) and 0.5 g. of sodium bicarbonate, were obtained. The wet crystals were washed with 92.5 g. of water, centrifuged and 12.1 g. of wet crystals, 93,4 ml. of washing water containing 0.4 g. of sodium itaconate (corresponding to 0.3 g. of free itaconic acid) and 0.2 g. of sodium bicarbonate, were obtained. The wet crystals were dried at 105° C. overnight and 8.8 g. of crude basic lead carbonate was obtained again. The mixture of the above mother liquor and the washing solution was concentrated at 40° C. and the crystallized sodium itaconate was centrifuged. The wet crystals were dried at 70° C. and 1.2 g. of sodium itaconate was obtained.

EXAMPLE 2

A glass cylinder having an inner diameter of 13 mm. was filled with 40 ml. of ion-exchange resin of carboxylic acid form (Amberlite XE 232) having an ion-exchange capacity of 4.4 mg. equivalent/ml. and 2 N sodium itaconate solution was flowed through the resin column at a flow speed of 0.76 ml./cm.²/min. until the resin was saturated with sodium ion. The amount of free itaconic acid in the effluent amounted to 10.14 g. The effluent was concentrated and free crystallized itaconic acid was centrifuged. The wet crystals were dried at 105° C. and 8.1 g. of itaconic acid were obtained.

What we claim is:

1. A process for recovering an alkali metal or ammonium salt of itaconic acid from a fermented broth of sugar sources in which substantial quantities are contained which comprises:
    A. separating solids from said fermented broth to obtain fermented broth liquids having said acid dissolved therein together with the impurities;
    B. adding basic lead carbonate to said liquids at a temperature of about room temperature and increasing the temperature to about 100° C. to precipitate a lead salt of said acid;
    C. separating said precipitate from said liquids;

D. contacting said precipitate with an aqueous solution of the carbonate or bicarbonate of alkali metal or ammonium to a water-soluble alkali metal salt or ammonium salt of said itaconic acid, and (2) a precipitate of basic lead carbonate;

E. separating the basic lead carbonate precipitate from the solution of alkali metal salt or ammonium salt of said acid; and F. concentrating the solution of the alkali metal or ammonium salt of said acid to crystallize out said salt.

2. The process of claim 1, wherein the sugar source is blackstrap molasses.

3. A process for recovering itaconic acid from a fermented broth of sugar sources in which substantial quantities of impurities are contained which comprises:

A. separating solids from said fermented broth to obtain fermented broth liquids having said acid dissolved therein together with the impurities;

B. adding basic lead carbonate to said liquids at a temperature of about room temperature and increasing the temperature to about 100° C. to precipitate a lead salt of said acid;

C. separating said precipitate from said liquids;

D. contacting said precipitate with an aqueous solution of the carbonate or bicarbonate of alkali metal or ammonium to form (1) a water-soluble alkali metal salt or ammonium salt of said itaconic acid, and (2) a precipitate of basic lead carbonate;

E. separating the basic lead carbonate precipitate from the solution of alkali metal salt or ammonium salt of said acid; and F. contacting the solution of alkali metal or ammonium salt of said acid with cation-exchange material and concentrating the obtained effluent to crystallize out said acid.

4. The process of claim 3, wherein the sugar source is blackstrap molasses.

* * * * *